United States Patent [19]

Maeda et al.

[11] 3,970,422
[45] July 20, 1976

[54] METHOD OF IMPROVEMENT IN COLORING GLASS FABRICS

[75] Inventors: Kozo Maeda; Masakazu Date, both of Takatsuki, Japan

[73] Assignee: Toyo Boseki Kabushiki Kaisha, Osaka, Japan

[22] Filed: Nov. 5, 1974

[21] Appl. No.: 521,057

[30] Foreign Application Priority Data
Nov. 9, 1973   Japan................ 48-126583

[52] U.S. Cl. ................................. 8/8; 8/168 R; 8/173
[51] Int. Cl.$^2$ ............................. D06P 3/80
[58] Field of Search ........................... 8/8, 168

[56] References Cited
UNITED STATES PATENTS

| | | | |
|---|---|---|---|
| 3,129,053 | 4/1964 | Castle | 8/93 |
| 3,259,517 | 7/1966 | Atwell | 117/54 |
| 3,518,205 | 6/1970 | Vukasovich | 252/301.3 |
| 3,617,162 | 11/1971 | June et al. | 8/8 |

FOREIGN PATENTS OR APPLICATIONS
7,221,909   6/1972   Japan

OTHER PUBLICATIONS

Scholes, "Modern Glass Practice," (Industrial Publications Inc., Chicago, 1952).
R. W. Moncrieff, "Man-Made Fibres," (Wiley Interscience, 1970), p. 578.
Bird, "The Theory and Practice of Wool Dyeing," (Soc. Dyers and Colourists, 1963), pp. 62–63.

*Primary Examiner*—Joseph L. Schofer
*Assistant Examiner*—A. L. Clingman
*Attorney, Agent, or Firm*—Stewart and Kolasch, Ltd.

[57] ABSTRACT

Glass fabrics are treated with a combination of a sulfur-oxygen containing acid or peroxy acid and an inorganic or organic water-soluble salt comprising a normal salt, an acid salt or a complex salt of an inorganic acid or an organic acid with a metal of Group I or Group II of the Periodic Table and/or with an ammonium group and then colored with a basic dye.

22 Claims, No Drawings

METHOD OF IMPROVEMENT IN COLORING GLASS FABRICS

The present invention relates to a method of an improvement in coloring glass fabrics and, more particularly, to a method of coloring glass fabrics with a basic dye.

Various attempts have heretofore been made to impart colors to glass fabrics. U.S. Pat. No. 2,664,365 discloses a process using latex-type pigment binders comprising a vinyl chloride polymer resin, an unvulcanized synthetic rubber latex and a water-soluble thermosetting urea-formaldehyde containing resin. British patent specification No. 742,073 sets forth a method in which a fabric of siliceous fibers printed with a paste containing a butadiene-acrylonitrile copolymer as a latex and an organic pigment is treated with an aldehyde and a Werner complex compound after the printed fabric is dried. Since fabrics to be colored by these processes are treated by means of heat at a temperature of 300° to 400° C. for 10 to 70 hours or at a temperature of 600° C. for about 1 minute prior to coloring in order to remove from the woven or knitted fabrics a thickener or size such as starch, gelatin, polyvinyl alcohol or polyacrylic acid which is used for spinning glass fibers (this treatment is sometimes referred to as a so-called "heat-cleaning" procedure hereinbelow), these methods tend to cause a decrease in the strength of glass fibers. The application of relatively lower temperatures of 300° to 400° C. to a batchwise "heat-cleaning" procedure requires a long period of time for drying the treated fabrics, thus decreasing the production efficiency. Where pigments are employed as in those methods, it is difficult to provide the glass fabrics with bright colors. In this case, color fastness to crocking may also be impaired. U.S. Pat. No. 3,512,915 describes a process for coloring textile fibers including glass fibers which comprises contacting said fibers with an aqueous dispersion of a mixture containing aminoalkyl silane, thereby introducing the amino group into said fibers, and dyeing the resulting fibers with an acid or reactive dye. U.S. Pat. No. 2,716,618 states that the dyeing process is carried out by producing a metallic oxide by treatment with a metallic salt and then by reacting the fabrics with an anionic dye capable of reacting with said metal. Since these methods also require the heat-cleaning procedure of the glass fabrics before being colored, there are some disadvantages involved in a decrease in the strength of the glass fibers, coloring with deep or dark colors and fastness particularly to the crocking, i.e., the undesirable tendency of coloring matter to rub off from a wet fabric. Furthermore, it is difficult for such a metal to obtain a bright shade. The heat-cleaning procedure and the other heat treatment procedure by which a metal oxide is formed cannot be applied to a mixed fabric woven with glass and other organic fibers.

It is also known from U.S. Pat. No. 2,849,333 that glass fabrics produced by using a water-swelling thickener or size are dyed with a water-soluble acid dye or direct dye without the employment of the heat-cleaning procedure. However, the use of such a thickener or size may provide a hard "hand" and low color fastness and may not make the glass fabrics colored with deep or dark colors. These colored textile fabrics, when brought into contact with fire, may cause the resinous portion thereof to be burned up or be fumed so that the inflammable property of the glass fibers woven together with the resins that is of the largest benefit for the glass fibers may be impaired. Furthermore, the methods as mentioned above still have the difficulties in coloring threads thereof, so that the threads thereof are colored by piece dyeing. The piece dyeing, however, makes it difficult to provide the fabrics with a plurality of colors and aesthetic characteristics.

In order to obviate some disadvantages conventional methods possess in coloring glass fibers, one of the present inventors has improved such drawbacks by treating glass fabrics with an acidic or neutral aqueous solution of a persulfuric acid or a salt thereof before dyeing said fabrics with a basic dye, and the invention was already published on June 20, 1972, in Japan as No. 21,909/1972 (now U.S. Pat. No. 669,290). Although this patented method can provide the glass fabrics with a good dyeing property, however, the sole use of such a persulfuric acid or a salt thereof has a disadvantage in impairing the strength of the glass fabrics.

Accordingly, it is an object of the present invention to provide a method of an improvement in coloring glass fabrics. Another object of the present invention is to provide a method in which glass fabrics are treated with a sulfur-oxygen containing acid or peroxy acid together with an inorganic water-soluble salt prior to coloring. A further object of the present invention is to provide a method by which the colored glass fabrics are provided with a soft hand. Another object of the present invention is to provide a method by which the glass fibers woven with other fibers, particularly organic fibers, are dyed or printed with a basic dye. Other objects, features and advantages of the present invention will become apparent during the course of the following description of the present invention.

The glass fibers or fabrics treated by the method of the present invention can be dyed or printed by medium or deep or dark colors with good uniform dyeability, brightness and color fastness. The colored fabrics can be provided with a good hand and improved strength.

The method of the present invention comprises the steps of treating glass fabrics with an aqueous solution comprising a combination of a sulfur-oxygen containing acid or a peroxy acid or a water-soluble salt thereof and an inorganic or organic water-soluble salt and then dyeing the fabrics with a basic dye. The treatment with the sulfur-oxygen containing acid or peroxy acid enables the omission of the heating process by which a thickener or size used for weaving or knitting glass fabrics is removed. This treatment can also provide the glass fabrics with a large affinity with a basic dye. The method of the present invention may be applicable to glass fibers or fabrics in a desired form such as glass wool, threads, yarn, knitted fabric, and woven and non-woven fabrics. Any dyeing method including dip dyeing, package dyeing, beam dyeing, pad dyeing and printing may be so applicable that the method of the present invention permits the use of dyed yarns and threads to provide the fabrics with a plurality of colors. The method of the present invention also enables a plurality of colors to be printed on the woven or knitted glass fabrics. Furthermore, a hard hand which is expected to be produced by the use of a resinous binder in the pigment may be avoided, thus providing the dyed fabrics with an extremely soft hand and a bright shade, coupled with favorable color fastness to crocking and light. In particular, conventional fabrics dyed or printed with a basic dye are lacking in fastness to light, but the method of the present invention can obviate such a drawback.

The use of a combination of the sulfur-oxygen containing acid or a peroxy acid or a water-soluble salt thereof with an inorganic or organic water-soluble salt according to the present invention can prevent a decrease in the strength of glass fabrics that may be brought about by treatment with the sole employment of persulfuric acids and can provide the glass fabrics with dyeability with a basic dye. From these favorable properties, the method of the present invention can produce a good effect for a mixed fabric made of glass fibers with organic fibers.

Although there is seen no definite cause that glass fabrics are provided with dyeability with dyes by treatment with the sulfur-oxygen containing acid or a peroxy acid or a water-soluble salt thereof in combination with an inorganic or organic water-soluble salt, it is to be assumed from the exhaustion of a basic dye by the treated glass fabrics and the good color fastness thereof that an anionic radical such as $SO_x^{--}$ (wherein $x$ is an integer of at least from one) is introduced into the glass fibers by reaction between the glass fibers and the acid, whereby the anionic radical can function as a dyeing site to which the basic dye can adhere. Another assumption is that peroxy acids or water-soluble salts thereof such as, for example peroxodisulfuric acid may form in an aqueous solution an ionic radical by the following equation:

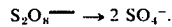

$$S_2O_8^{--} \rightarrow 2\ SO_4^-.$$

This radical may in turn join to a silanol radical or -O-Si-OH.

This silanol radical is a hydrate of the main ingredient of the glass fibers or $SiO_2$ which is deemed to be present on the surface of the glass fibers, thus providing a dyeing site to which the basic dye can adhere.

When no inorganic or organic water-soluble salt is used, the bath in which the glass fabrics are treated prior to coloring has a strong acidic strength so that the surface of the glass fibers thereof is caused to be ionized, and thereby a portion of the glass ingredient caused to be eluted into the bath from the surface of the glass fibers. Because of the elution of the glass ingredient, a decrease in the strength of the treated glass fabrics is considered to take place.

The use of an inorganic water-soluble salt in combination with the sulfur-oxygen containing acid or peroxy acid according to the present invention, however, can prevent considerably a decrease in the strength of the glass fabrics which is caused by the sole of a persulfate. The use of such a salt is assumed to provide an effect to control such an elution of the glass component by means of the dialytic effect which may be brought about by approach and adhesion of said water-soluble salt to the surface of the glass fibers at a speed equal to or faster than that of the acid radical of the sulfur-oxygen containing acid or the peroxy acid that is deemed to cause a decrease in the strength of the glass fibers. It is to be noted, however, that these assumptions do not affect adversely the effects obtained by the method of the present invention.

The sulfur-oxygen containing acid or an acid salt thereof to be used for the method of the present invention includes, for example, a sulfur-oxygen acid, a sulfonic acid and a sulfinic acid and an acid salt thereof. Illustrative examples of the sulfur-oxygen acids are sulfuric, sulfurous, pyrosulfuric, pyrosulfurous, dithionic, polythionic and hyposulfurous acids. The acid salt of said sulfuroxygen acid includes, for example, acid sodium sulfate, acid potassium sulfate, acid ammonium sulfate, acid sodium sulfite, acid potassium sulfite, acid ammonium sulfite, acid sodium pyrosulfate, acid potassium pyrosulfate, acid ammonium pyrosulfate, acid sodium pyrosulfite, acid potassium pyrosulfite and acid ammonium pyrosulfite; pyrosulfates and pyrosulfites and their acid salts as well as acid sulfates and acid sulfites are preferred. When the acid salts are used, it is not required to use additionally an organic or inorganic water-soluble salt because, for example, acid sodium sulfate is a mixture of sulfuric acid or sodium sulfate. However, it is preferable to add such an inorganic or organic water-soluble salt in order to produce a more favorable effect. It is also to be noted that a compound such as methyl sulfate or sodium pyrosulfate can be used for this purpose which can form the corresponding sulfur-oxygen acid or the acid salt thereof by thermal decomposition or hydrolysis during the course of the treatment with such a compound by this following equations:

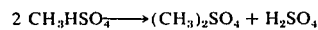
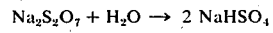

$$2\ CH_3HSO_4 \rightarrow (CH_3)_2SO_4 + H_2SO_4$$

$$Na_2S_2O_7 + H_2O \rightarrow 2\ NaHSO_4$$

The sulfonic or sulfinic acids include, for example, methanesulfonic acid, benzenesulfonic acid, benzenedisulfonic acid, o-, m- or p-toluenesulfonic acid, toluene-2,4,6-trisulfonic acid, naphthalenesulfonic acid, 1,5-, 1,6-, 2,6- or 2,7-naphthalenedisulfonic acid, 4-hydroxybenzenesulfonic acid, sulfosuccinic acid, 4,5-sulfosalicylic acid, sulfamic acid, aminoethanesulfonic acid, sulfanilic acid, naphthylaminesulfonic acid, aminonaphtholsulfonic acid, aminonaphtholdisulfonic acid, benzenesulfinic acid, naphthalenesulfinic acid, o-, m-, or p-toluenesulfinic acid or aminoethane sulfinic acid.

The peroxy acid and a water-soluble salt thereof to be used in the method of the present invention includes, for example, peroxysulfuric acid, peroxydisulfuric acid, peroxyphosphoric acid, peroxydiphosphoric acid or its sodium, potassium, ammonium or acid salts. Preferred illustrative examples of the peroxy acids or the ammonium or acid salts are, for example, peroxysulfuric acid, peroxydisulfuric acid, ammonium peroxysulfate, ammonium peroxysulfate, acid ammonium peroxysulfate, acid sodium peroxydisulfate, acid potassium peroxysulfate, acid ammonium peroxydisulfate, acid sodium peroxydisulfate or acid potassium peroxydisulfate.

The sulfur-oxygen containing acid or peroxy acid or the water-soluble salt thereof may be used alone or in combination. The amount of these compounds is usually from about 0.1 to 10 percent, preferably from about 0.3 to 2 percent, by weight of the treating solution. When these compounds are used in an amount smaller than the lower limit, an appropriate dyeability is not expected to be produced. With these compounds in amounts beyond the upper limit, the use of such a large amount thereof is inadequate because the degradation of the fibers may be caused to a great extent.

The inorganic or organic water-soluble salt to be used for the present invention is a water-soluble normal salt, an acid salt or a complex salt comprising a salt of an inorganic or organic acid with a metal of Group I or II of the Periodic Table and/or with an ammonium group. The metal thereof includes, for example, sodium, potassium, calcium, copper, magnesium, zinc or barium. The inorganic acid includes, for example, hydrochloric acid, nitric acid, sulfuric acid, sulfurous acid, thiosulfuric acid, boric acid, phosphoric acid or carbonic acid. The organic acid includes, for example, formic acid, acetic acid or oxalic acid. The use of the water-soluble salt with the mono- or divalent inorganic acid having a relatively high degree of electrolytic dissociation such as, for example, hydrochloric acid, sulfuric acid, sulfurous acid or boric acid as an anion is preferred from the effects associated with the improved dyeability with a basic dye and the prevention of a decrease in the strength of the glass fabrics. Preferred illustrative examples of such water-soluble salts are sodium chloride, potassium chloride, calcium chloride, barium chloride, magnesium chloride, zinc chloride, ammonium magnesium chloride, sodium magnesium chloride, ammonium chloride, sodium sulfate, potassium sulfate, magnesium sulfate, zinc sulfate, ammonium sulfate, calcium sulfate, potassium ammonium sulfate, ammonium magnesium sulfate, potassium magnesium sulfate, sodium magnesium sulfate, sodium tetraborate, potassium tetraborate, sodium sulfite or potassium sulfite.

The inorganic or organic water-soluble salt may be used alone or in combination. The amount of the inorganic or organic water-soluble salt may vary depending upon the type or concentration of the sulfur-oxygen containing acid or peroxy acid to be used or conditions under which the fabrics are treated. The salt may be employed in a molar ratio to the concentration of the acid radical of the sulfur-oxygen containing acid or peroxy acid of from about 1:0.1 to 1:20.0 and, preferably, from about 1:0.3 to 1:1.5. The amount below the lower limit does not prevent a decrease in the strength of the fibers, and the use thereof in amounts greater than the upper limit is practically unnecessary although a favorable effect can be produced.

The procedure by which glass fabrics are treated prior to dyeing or printing may be: a procedure in which the glass fabrics are dipped into an aqueous solution containing a member or a combination of members selected from the sulfur-oxygen containing acid or peroxy acid and a member or a combination of members selected from the inorganic or organic water-soluble salt; and a procedure in which said treating aqueous solution is brought into contact with said glass fabrics by any desired means such as padding, spraying or coating and said glass fabrics are heated batchwise for a relatively long period of time or treated by steam or heated continuously for a relatively short period of time. The dipping procedure is preferred for this purpose.

The temperature at which the glass fabrics are treated may vary depending upon the type or concentration of the sulfur-oxygen containing acid or peroxy acid to be used or conditions under which the treatment is carried out and may be usually in any desired range about 0° C. to the boiling point of the treating aqueous solution. The treatment procedure may be carried out under elevated pressures. The dipping procedure may be preferably conducted at a temperature from about 60° to 100° C. and the steaming procedure from about 80° to 130° C.

The treating time vary depending upon the treating temperature or conditions and may be usually from about 1 minute to several days and, preferably, from about 2 to 300 minutes. The higher the treating temperature, the shorter will generally become the treating period.

After the treatment procedure, the glass fabrics are generally washed with water and dried for a further treatment. However, the washed glass fabrics may be dyed without being dried.

For the glass fabrics treated by the procedure of the present invention, a water-soluble polymeric thickener or size which is used upon spinning is removed completely during the treatment procedure in which the sulfur-oxygen containing acid or peroxy acid is used, so that the treated glass fabric can be subjected to desizing or scouring to thereby avoid the "heat-cleaning" procedure. The treatment procedure can also provide the glass fabrics with a sufficient amount of dyeing sites for the basic dye. When a water-insoluble polymeric thickener or size is used as the thickener or size, the glass fabrics treated by the method of the present invention can be provided with a sufficient dyeability with a basic dye and a favorable color fastness even without removal of such a thickener or size. The use of the water-insoluble thickener or size may have an advantage in improving the strength of the glass fabrics which otherwise is greatly impaired by the employment of the sulfur-oxygen containing acid or peroxy acid.

The glass fabrics which were treated with a combination of the sulfur-oxygen containing acid or peroxy acid with the inorganic or organic water-soluble salt may then be dyed with a basic dye by the exhaustion dyeing technique in a conventional manner. For dyeing yarns, the cheese dyeing is preferred. For the piece dyeing, the dyeing method such as beam dyeing in which materials are dyed with circulating dyeing solutions is desired. In the latter case, it is very practicably convenient because such dyeing solutions do not require the adjustment of their pH values and addition thereto of a dyeing auxiliary.

The glass fabrics treated by the procedure of the present invention may be printed with a printing paste containing a basic dye in a conventional manner or similarly subjected to a pad dyeing with a dyeing solution containing the basic dye.

The dyeing conditions may vary depending upon which method is applied to the glass fibers to be dyes. The dyeing may be usually for about 30 seconds to some ten hours at a temperature from about 20° to 180° C. and preferably for about 1 minute to 2 hours at 80° to 130° C.

The glass fabrics to be dyed or printed in the practice of the present invention may further be treated with a thermoplastic resin, particularly a reactive thermoplastic resin such as, for example, a reactive acrylic resin, e.g., a polyacrylic acid ester, in order to improve the physical properties of the glass fabrics including abrasion resistance and color fastness to washing. The treatment with said thermoplastic resin may serve to prevent the slippage of yarns which may take place with a fabric woven on the whole with glass fibers and provide the glass fabrics with elasticity.

The glass fabrics of the present invention may be in the form of glass wool, threads, yarns, knitted fabric, or woven or non-woven fabrics composed of glass fibers produced by spinning molten glass or mixed fabrics woven with said glass fibers and organic or inorganic fibers. Such inorganic or organic fibers to be woven together with the glass fibers are preferably those that are fireproof in order to facilitate the characteristic features of the glass fibers, namely, the fireproof and non-fusible properties thereof. Such fibers may preferably be a fireproof, organic fiber such as, for example, an acrylic fiber, modacrylic fiber, a polychlal fiber, a vinylidene chloride fiber, natural polyamide fiber and a fireproof, modified synthetic polyamide fiber.

The untreated glass fibers may first be woven prior to said treatment together with the dyed, dope-dyed or non-dyed yarn of said organic fibers and then subjected to treatment with an aqueous solution of the sulfur-oxygen containing acid or peroxy acid and the inorganic water-soluble salt. The glass fibers previously treated by said procedure may be woven together with said yarns of the organic fibers. The glass fabrics thus obtained may then be dyed with any desired basic dye, resulting in fabrics with a plurality of colors or multicolors. The dye may be limited to any particular one and may be of any desired type that can color the glass fabrics.

The method of weaving the glass fibers with the other organic fibers may be any method including union twisting, filament combining, doubling, union cloth weaving or the mixed knitting method. The method of the present invention may also be applicable with a favorable result to a covered yarn prepared by winding up the glass fiber filament as a core yarn around the core yarn.

The following examples illustrate the present invention without, however, limiting the same thereto. In the following examples, percent is by weight unless otherwise specified.

EXAMPLE 1

Glass fiber filament yarn ECDE 150-1/2 was dipped into an aqueous solution containing 1 per cent of ammonium peroxydisulfate and 0.3 per cent of a water-soluble salt as stated in Table 1 below and treated for 30 minutes at 100° C. After being washed with water, the yarn was dyed with 1 per cent of Sevron Red L (E. I. du Pont de Nemours & Co., C. I. Basic Red 17) based on the weight of fabric in the liquor ratio of 1:30 for 60 minutes at 80° C., washed with water and dried. The loop strength (in kg. per sq. mm.) and the take-up of dye (represented in Terms of k/s) of the dyed filament yarn are shown in Table 1.

Table 1

| Water-Soluble Salts | pH of Treating Solutions Before Treatment | pH of Treating Solutions After Treatment | Loop Strength,[1] kg./sq.mm. | Take-up of Dye[2] k/s |
|---|---|---|---|---|
| None | 6.6 | 1.9 | 9.2 | 16.0 |
| Potassium chloride | 6.5 | 1.9 | 21.0 | 15.8 |
| Ammonium chloride | 6.5 | 1.8 | 19.7 | 14.6 |
| Calcium chloride | 6.4 | 1.8 | 13.7 | 15.5 |
| Magnesium chloride | 6.4 | 1.9 | 23.6 | 15.8 |
| Sodium sulfate | 6.6 | 2.0 | 28.0 | 16.2 |
| Potassium sulfate | 6.7 | 2.2 | 18.6 | 16.0 |
| Calcium sulfate | 6.6 | 1.9 | 21.6 | 13.4 |
| Magnesium sulfate | 6.5 | 2.0 | 20.3 | 14.6 |
| Ammonium sulfate | 6.6 | 2.0 | 25.3 | 15.0 |
| Borax | 8.0 | 2.1 | 23.8 | 15.0 |
| Potassium phosphate | 8.6 | 2.5 | 26.2 | 7.2 |
| Sodium hydrogen phosphate | 7.7 | 2.2 | 29.5 | 11.8 |
| Ammonium phosphate | 8.4 | 2.7 | 26.9 | 9.6 |
| Sodium formate | 6.3 | 2.9 | 28.7 | 5.3 |
| Sodium acetate | 6.9 | 3.1 | 19.6 | 6.2 |
| Potassium oxalate | 6.6 | 2.8 | 27.0 | 8.4 |
| Ammonium oxalate | 5.9 | 3.2 | 23.8 | 5.6 |
| Non-Treated Filaments | none | none | 31.2 | 0 |

[1] The loop strength (in kg. per square mm.) was determined according to JIS L-1070, 5.3.1 where the yarn having a length of 20 cm. was used, and expressed in kg. per unit cross section of the filament yarn.

[2] The take-up of dye (absorption coefficient of a dyeing material, k/dispersion coefficient of a dyeing material, s) was measured by the following equation:

$$\text{Take-up of dye } (k/s) = \frac{(1-R)^2}{2R}$$

where R is the deflection ratio at the maximum absorption wavelength in which the inflection ratio of a white magnesium oxide plate is set to be 1.0.

This table shows that the method of the present invention provides the glass fiber filament yarn with an excellent dyeing property and loop strength as compared with the filament yarn treated by the sole use of ammonium peroxydisulfate. No spot stained by the dye was observed where the method of the present invention was applied.

EXAMPLE 2

Glass fiber filament yarn ECDE 150-1/2 and glass fiber bulky yarn EBG 150-1/4 both in the form of a cheese, were individually treated with an aqueous solution containing 1.0 per cent of ammonium peroxysulfate and 0.3 per cent of sodium sulfate by means of an over maier-type machine for 30 minutes at 100° C. while the dyeing solution was being circulated and then washed with water for 10 minutes.

The filament yarn ECDE 150-1/2 was then dyed separately and individually with 1 per cent of each of Sandocryl Orange B-3RLE (trade mark of Sandoz A. G.; C. I. Basic Orange 38) or Astrazon Yellow 7GLL (trade mark of Farbenfabriken Bayer A. G.; C. I. Basic Yellow 21) and Deorlence Fast Red 2GL (trade mark of Ciba-Geigy, Limited; C. I. Basic Red 54) based on the weight of the yarn for 60 minutes at 80°C.

The bulky yarn EBG 150-1/4 was dyed with 1 per cent of Astrazon Yellow 76LL (trade mark) based on the yarn weight for 60 minutes at 80° C., washed with water and dried.

The yarns which were woven with the separately colored yarns as the warp and the dyed yarn as the weft provided the glass fabrics with a soft hand and an aesthetic appearance.

EXAMPLE 3

A fabric woven with glass fiber threads ECE 225-1/2 as the warp and EBDE 150-1/6 as the weft was treated with an aqueous solution containing 0.5 per cent of peroxyslfuric acid and 0.3 per cent of ammonium sulfate for 30 minutes at 90° C., washed with water and immediately thereafter dyed with 1.5 per cent of Maxilon Blue GRL (trade mark of Ciba-Geigy, Limited; C. I. Basic Blue 41) based on the fabric weight. The resulting colored glass fabric was provided with a soft and brilliant navy blue color shade.

EXAMPLE 4

A fabric woven with glass fiber threads ECD 450-2/2 as the warp and ECG 150-1/4 ("Taslan"; trade mark of E. I. du Pont de Nemours & Co.) as the weft was treated with an aqueous solution of 1 per cent of a sulfur-oxygen containing acid and 0.3 per cent of an inorganic water-soluble salt, both being stated in Table 2 below, for 30 minutes while boiling the solution, washed with running waters for 5 minutes, dyed with 1 per cent of Sevron Red L (C. I. Basic Red 17) based on the fabric weight for 60 minutes at 80° C., washed with water, and dried. The dyed fabrics were tested with respect to its takeup of dye and the loop strength of the warp thereof. The results are shown in Table 2.

Table 2

| Composition of Treating Solutions | | Loop Strength, kg./sq.mm. | Take-up of Dye k/s |
|---|---|---|---|
| Sulfur-oxygen containing Acids | Inorganic Water-Soluble Salts | | |
| $NaHSO_4$ | none | 19.5 | 13.5 |
| —do— | Sodium sulfate | 26.7 | 13.2 |
| $NaHSO_3$ | none | 20.1 | 13.3 |
| $NaHS_2O_7$ | Ammonium sulfate | 26.3 | 14.8 |
| $NaHS_2O_7$ | Sodium sulfate | 26.5 | 14.5 |
| $Na_2S_2O_7$ | —do— | 28.6 | 14.5 |
| Sulfamic acid | —do— | 23.4 | 11.8 |
| Sulfanilic acid | —do— | 25.2 | 11.0 |
| Aminonaphthol-sulfonic acid | —do— | 25.0 | 10.3 |
| p-Toluenesulfonic acid | —do— | 21.3 | 13.8 |
| $(NH_4)_2S_2O_8$ | none | 10.6 | 16.0 |
| Non-Treated Fabric | none | 33.5 | 0 |

The fabrics dyed according to the method of the present invention were found to have an excellent loop strength and dyeing property.

EXAMPLE 5

Three different types of modacrylic fiber yarns ("Kanekalon"; trade mark of Kanegafuchi Chemical Industry, Co.), one being not dyed and the other two being dyed separately yellow and blue and glass fiber yarn ECG 150-1/6 (Taslan) were used as the warp and weft, respectively, to make a casement gauze fabric. The fabric was then treated with an aqueous solution containing 0.5 per cent of ammonium peroxydisulfate and 0.3 per cent of sodium sulfate for 30 minutes at 100° C., washed with water, dried and dyed with 0.5 per cent of Deorlene Fast Red 2 GL (C. I. Basic Red 54) based on the fabric weight by means of a beam dyeing machine for 30 minutes at 80° C.

The dyed fabrics having the red, orange, and violet colored threads of the warp and the red threads of the weft were provided with brilliant colors and fine hand.

EXAMPLE 6

A fabric woven with glass fiber yarns ECE 225-1/2 as the warp and ECDE 150-1/4 (Taslan) as the weft was treated with an aqueous solution containing 1.0 per cent of ammonium peroxydisulfate and 0.3 per cent of ammonium sulfate in the liquor ratio of 1:10 for 20 minutes at 95° C. by means of a beam dyeing machine, washed with water for 5 minutes and dried.

The fabric was then printed with a printing paste comprising 60 parts by weight of a 15 per cent guargum solution (Maypro Gum NP; trade mark of Mayhall, Inc.), 5 parts by weight of Deorlene Fast Red 2GL and 35 parts by weight of water by means of an autoscreen printing machine operating at a printing speed of 10 meters per minute, steamed for 20 minutes at 100° C., washed with water and dried. The printed glass fabric was found to have a clear shade and a favorable hand.

EXAMPLE 7

Glass fiber yarn ECDE 150-1/4 (Taslan) in the cheese form was treated with an aqueous solution containing 5 per cent of sodium hydrogen sulfite and 0.5 per cent of ammonium sulfate in the liquor ratio of 1:20 for 30 minutes at 100°C. by means of an over maier dyeing machine, washed with water and dried.

The glass fiber yarn thus treated was used as the weft and polychlal fiber (Kodelan; trade mark of Kojin, Ltd.) textured yarn 1/16'$^s$ as the warp to make a fabric which was in turn printed in the same manner as in Example 4. The printed fabric was found to be fireproof and to have a clear color shade and a favorable hand.

EXAMPLE 8

The dyed glass fabric obtained in Example 2 was then padded by passing it through a solution comprising 5 parts by weight of a polyacrylic acid ester emulsion (Rhoplx B-15; trade mark of Rohm and Haas, Co.), 3 parts by weight of a methylated methylol melamine (Sumitex Resin M-3; trade mark of Sumitomo Chemical Company, Limited), 0.3 part by weight of an organic amine hydrochloride catalyst (Sumitex Accelerator ACX; trade mark of Sumitomo Chemical, Limited); 1.0 part by weight of an epoxysilane (A-187 manufactured by Union Carbide Corp.) and 90.7 parts by weight of water. The water was then squeezed out of the fabric to a wet pick-up of 30 per cent, dried at 80° C. and heat-treated for 5 minutes at 150° C.

The dyed glass fabric obtained herein was compared with the dyed glass fabric obtained in Example 2 above and a commercially available fabric dyed with a pigment with respect to various fastness properties. Table 3 shows the test results.

Table 3

| Physical Properties | | Glass fabric of Example 2 | Glass fabric of Example 8 | Commercially available fabric |
|---|---|---|---|---|
| Fastness to light[1] | | >4 | >4 | >4 |
| Fastness to Wash[2] | Effect on the dyeing | 3 | 5 | 4–5 |
| | Staining of cotton | 4–5 | 5 | 5 |
| Fastness to Crocking[3] | Dry | 4 | 4–5 | 3–4 |
| | Wet | 3–4 | 4 | 1–2 |

Note: The values mean the rating wherein 5 is

Table 3-continued

| Physical Properties | Glass fabric of Example 2 | Glass fabric of Example 8 | Commercially available fabric |
|---|---|---|---| excellent and 1 is poor.
1) The fastness to light was measured according to JIS L-0842-1971.
2) The fastness to wash was measured according to JIS L-0844-1970 A-2.
3) The crock fastness was measured according to JIS L-0849-1971.

As can be seen from Table 3 above, the glass fabric obtained in Example 2 was found to have excellent fastness to light and crocking, but it hs a disadvantage with respect to fastness to wash. However, this disadvantage was obviated by treating such a glass fabric with a small amount of a polyacrylic acid ester emulsion as with the fabric obtained in Example 8. The glass fabric obtained in Example 8 had also a soft hand and a clear color shade coupled with an excellent fastness to dyeing.

What we claim is:

1. A method for coloring a glass fabric which comprises treating the glass fabric with a combination of one or more sulfur-oxygen containing acids or peroxy acids or a water-soluble salt thereof and one or more organic or inorganic water-soluble salts of an inorganic acid or an organic acid with a metal of Group I or Group II of the Periodic Table and/or with an ammonium group, and then dyeing the treated glass fabric with a basic dye, whereby the resultant fabric has an improved dyeing property and loop strength.

2. The method according to claim 1, wherein the sulfur-oxygen containing acid is a member selected from the group consisting of a sulfur-oxygen acid and an acid salt thereof, a sulfonic acid, a sulfinic acid and a water-soluble salt thereof.

3. The method according to claim 2, wherein the sulfur-oxygen acid is sulfuric acid, pyrosulfuric acid, sulfurous acid, pyrosulfurous acid, dithionic acid, polythionic acid or hyposulfurous acid.

4. The method according to claim 2, wherein the acid salt of the sulfur-oxygen acid is acid sodium sulfate, acid potassium sulfate, acid ammonium sulfate, acid sodium sulfite, acid potassium sulfite, acid ammonium sulfite, acid sodium pyrosulfate, acid potassium pyrosulfate, acid ammonium pyrosulfate, acid sodium pyrosulfite, acid potassium pyrosulfite or acid ammonium pyrosulfite.

5. The method according to claim 2, wherein the sulfonic acid is methanesulfonic acid, benzenesulfonic acid, benzene disulfonic acid, o-, m- or p-toluenesulfonic acid, toluene-2,4,6-trisulfonic acid, naphthalenesulfonic acid, 1,5-, 1,6-, 2,6- or 2,7-naphthalenesulfonic acid, 4-hydroxybenzenesulfonic acid, sulfosuccinic acid, 4,5-sulfosalicylic acid, sulfamic acid, aminoethanesulfonic acid, sulfanilic acid, naphthylaminesulfonic acid, aminonaphtholsulfonic acid or aminonaphtholdisulfonic acid.

6. The method according to claim 2, wherein the sulfinic acid is benzenesulfinic acid, naphalenesulfinic acid, o-, m- or p-toluenesulfinic acid or aminoethane sulfinic acid.

7. The method according to claim 1, wherein the peroxy acid is peroxysulfuric acid, peroxydisulfuric acid, peroxyphosphoric acid or peroxydiphosphoric acid.

8. The method according to claim 1, wherein the water-soluble salt of the peroxy acid is a sodium, potassium of ammonium salt of said peroxy acid.

9. The method according to claim 8, wherein the water-soluble salt of the peroxy acid is ammonium peroxysulfate, ammonium peroxydisulfate, acid ammonium peroxysulfate, acid sodium peroxysulfate, acid potassium peroxysulfate, acid ammonium peroxydisulfate, acid sodium peroxydisulfate or acid potassium peroxydisulfate.

10. The method according to claim 1, wherein the organic or inorganic water-soluble salt is a member selected from the group consisting of a normal salt, an acid salt and a complex salt comprising a salt of an inorganic acid or an organic acid with a metal of Group I or II of the Periodic Table and/or with an ammonium group.

11. The method according to claim 10, wherein the inorganic acid is hydrochloric acid, nitric acid, sulfuric acid, boric acid, sulfurous acid, thiosulfuric acid, carbonic acid or phosphoric acid.

12. The method according to claim 10, wherein the organic acid is formic acid, acetic acid or oxalic acid.

13. The method according to claim 10, wherein the metal of Group I or II of the Periodic Table is sodium, potassium, calcium, copper, magnesium, zinc or barium.

14. The method according to claim 1, wherein the sulfur-oxygen containing acid or peroxy acid or a water-soluble salt thereof and the organic or inorganic water-soluble salt are used together in the form of an aqueous solution.

15. The method according to claim 14, wherein the sulfur-oxygen containing acid or peroxy acid or a water-soluble salt thereof is used in an amount from about 0.1 to 10 per cent by weight of the aqueous solution.

16. The method according to claim 15, wherein the amount is from about 0.3 to 2 per cent by weight of the aqueous solution.

17. The method according to claim 14, wherein the organic or inorganic water-soluble salt is used in a molar ratio to the acid radical of the sulfur-oxygen containing acid or peroxy acid or a water-soluble salt thereof of about 1:0.1 to 1:20.0.

18. The method according to claim 17, wherein the molar ratio is from about 1:0.3 to 1:1.5.

19. The method according to claim 14, wherein the glass fabric is heated at from about 60° to 100° C. for about 2 to 300 minutes in the aqueous solution.

20. The method according to claim 19, wherein the glass fabric is composed of glass fibers in the form of glass wool, filament, thread, woven fabric, knitted fabric or non-woven fabric.

21. The method according to claim 20, wherein the glass fabric is woven or knitted with a natural or artificial organic fiber.

22. The method according to claim 21, wherein the artificial organic fiber is an acrylic fiber, a modacrylic fiber, a polychlal fiber, vinylidene chloride fiber or a fireproof, modified synthetic polyamide fiber.

* * * * *